(12) United States Patent
Heitzenrater

(10) Patent No.: US 10,982,696 B2
(45) Date of Patent: Apr. 20, 2021

(54) TRANSMISSION AIR VENT SYSTEM

(71) Applicant: GM Global Technology Operations LLC, Detroit, MI (US)

(72) Inventor: Scott Heitzenrater, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 16/370,161

(22) Filed: Mar. 29, 2019

(65) Prior Publication Data

US 2020/0309168 A1 Oct. 1, 2020

(51) Int. Cl.

| F16D 25/10 | (2006.01) |
|---|---|
| F15B 21/044 | (2019.01) |
| F16H 61/30 | (2006.01) |
| F16D 25/12 | (2006.01) |
| F16D 25/0638 | (2006.01) |
| F16J 15/3284 | (2016.01) |
| F16H 57/027 | (2012.01) |
| F16H 61/00 | (2006.01) |

(52) U.S. Cl.
CPC ........ *F15B 21/044* (2013.01); *F16D 25/0638* (2013.01); *F16D 25/12* (2013.01); *F16H 57/027* (2013.01); *F16H 61/30* (2013.01); *F16J 15/3284* (2013.01); *F16D 25/10* (2013.01); *F16H 2061/004* (2013.01)

(58) Field of Classification Search
CPC ...... F15B 21/044; F16H 61/30; F16H 57/027; F16H 2061/004; F16J 15/3284; F16D 25/12; F16D 25/0638; F16D 25/10
See application file for complete search history.

(56) References Cited

U.S. PATENT DOCUMENTS

| 6,305,521 B1 * | 10/2001 | Hall, III | F15B 21/044 |
|---|---|---|---|
| | | | 192/85.41 |
| 9,765,828 B2 * | 9/2017 | Tohyama | F16D 55/40 |
| 10,641,374 B2 * | 5/2020 | Jo | F16H 45/02 |
| 2018/0313407 A1 * | 11/2018 | Smith | F16D 13/46 |

* cited by examiner

*Primary Examiner* — David J Hlavka

(57) ABSTRACT

An automobile vehicle transmission air vent system includes a first component of a vehicle transmission having a resilient material seal member retained in a cavity created in the first component. A second component of a metal material includes a vent groove facing toward the seal member. A clutch pack of the vehicle transmission is actuated by one of the first component or the second component being displaced into engagement with the clutch pack. The vent groove receives a portion of the seal member in a first displaced position of the displaced one of the first component or the second component defining an air and oil flow path through the vent groove between the first component and the second component. The seal member is positioned outside of the vent groove in a second displaced position of the displaced one of the first component or the second component.

16 Claims, 6 Drawing Sheets

TRANSMISSION AIR VENT SYSTEM

INTRODUCTION

The present disclosure relates to vehicle automatic transmission clutches and brakes.

Automobile vehicles including cars, sport utility vehicles and light duty trucks commonly include a multiple speed automatic transmission. Gear shifts are commonly accomplished using hydraulically actuated pistons that engage or disengage clutches and brakes. When vehicle operation ends and hydraulic pressure is no longer available in the transmission, hydraulic fluid settles to the bottom of the transmission and air in the transmission collects in the upper regions of the transmission. This volume of air in the area of the clutch or brake pistons effects initial operation of the transmission when the vehicle is restarted due to compression of the air by hydraulic fluid pressure flowing to the pistons, which can cause an incomplete gear shift or delay the gear shift.

Resilient material seals are commonly provided between the transmission pistons and structure such as the transmission housing. The seals minimize loss of hydraulic pressure past the pistons, and may prevent outflow of air trapped in the transmission past the pistons. Modifications to the seals have been made to allow air bleed past the pistons. The seals are provided with through holes or grooves which are sized to permit air passage during initiation of transmission operation, with minimal subsequent hydraulic fluid loss. It has been found that these through holes function at nominal operating conditions, but due to resilient material deflection limit air passage outside of the nominal design conditions, thereby preventing or slowing venting of air from the transmission to initiate shifting.

Thus, while current automatic transmission piston seal air vent holes achieve their intended purpose, there is a need for a new and improved system and method for venting air from an automatic transmission prior to an initial clutch engagement.

SUMMARY

According to several aspects, a transmission air vent system includes a first component of a vehicle transmission having a resilient material seal member positioned in a seal member cavity created in the first component. A second component of a metal material has a vent groove formed in the second component. One of the first component or the second component displaces with respect to the other one of the first component or the second component. The vent groove receives a portion of the seal member in a first displaced position of the displaced one of the first component or the second component defining an air and oil flow path through the vent groove between the first component and the second component. The seal member is positioned outside of the vent groove in a second displaced position of the displaced one of the first component or the second component.

In another aspect of the present disclosure, the first component defines a clutch piston; and the second component defines a transmission housing.

In another aspect of the present disclosure, when the seal member is positioned outside of the vent groove in the second displaced position the seal member sealingly engages with the transmission housing.

In another aspect of the present disclosure, the first component defines a dam; and the second component defines a longitudinal body portion of a clutch piston.

In another aspect of the present disclosure, when the seal member is positioned outside of the vent groove in the second displaced position the seal member sealingly engages with the longitudinal body portion of the clutch piston.

In another aspect of the present disclosure, the first component defines a stop; and the second component defines clutch piston.

In another aspect of the present disclosure, when the seal member is positioned outside of the vent groove in the second displaced position the seal member sealingly engages with the clutch piston.

In another aspect of the present disclosure, the vent groove includes a rounded first end and a rounded second end.

In another aspect of the present disclosure, a clearance gap is created between the portion of the seal member and a wall of the vent groove when the vent groove is in the first displaced position, the clearance gap defining the air and oil 13 flow path for air to bleed past the seal member.

In another aspect of the present disclosure, a length of the clearance gap is predefined as a distance between a return position and a stroked position of the displaced one of the first component or the second component.

According to several aspects, a transmission air vent system includes a first component of a vehicle transmission having a resilient material seal member retained in a seal member cavity created in the first component. A second component of a metal material has a vent groove formed in the second component facing toward the seal member. A clutch pack of the vehicle transmission is actuated by one of the first component or the second component being displaced into engagement with the clutch pack. The vent groove receives a portion of the seal member in a first displaced position of the displaced one of the first component or the second component defining an air and oil flow path through the vent groove between the first component and the second component. The seal member is positioned outside of the vent groove in a second displaced position of the displaced one of the first component or the second component.

In another aspect of the present disclosure, the vent groove includes a rounded first end and a rounded second end allowing unimpeded entrance of the seal member into the vent groove and exit of the seal member out of the vent groove between the first displaced position and the second displaced position.

In another aspect of the present disclosure, a length of the vent groove is predefined as a distance between a return position and a stroked position of the displaced one of the first component or the second component.

In another aspect of the present disclosure, a depth of the vent groove is predetermined to create a minimum clearance gap of the vent passage between a free end of the seal member and an inner wall of the vent groove when the seal member is positioned at least partially within the vent groove.

In another aspect of the present disclosure, the first component defines a clutch piston. The second component defines a transmission housing. When the seal member is positioned outside of the vent groove in the second displaced position the seal member elastically deflects to sealingly engage with the transmission housing.

In another aspect of the present disclosure, the first component defines a dam. The second component defines a longitudinal body portion of a clutch piston. When the seal member is positioned outside of the vent groove in the second displaced position the seal member elastically deflects to sealingly engage with the longitudinal body portion of the clutch piston.

In another aspect of the present disclosure, the first component defines a stop. The second component defines clutch piston. When the seal member is positioned outside of the vent groove in the second displaced position the seal member elastically deflects to sealingly engage with the clutch piston.

According to several aspects, a transmission air vent system includes a first component of a vehicle transmission has a resilient material seal member retained in a seal member cavity created in the first component. A second component of a metal material has multiple vent grooves formed at predetermined intervals about a perimeter of the second component, the multiple vent grooves facing toward the seal member. A clutch pack of the vehicle transmission actuated by one of the first component or the second component being displaced into engagement with the clutch pack. A flow passage communicates a pressurized fluid to one of the first component or the second component to displace the one of the first component or the second component. The vent groove receives a portion of the seal member in a first displaced position of the displaced one of the first component or the second component defining an air and oil flow path through the vent groove between the displaced one of the first component or the second component allowing air and oil flow from the flow passage through the air and oil flow path. The seal member is positioned outside of the vent groove in a second displaced position of the displaced one of the first component or the second component blocking flow through the air and oil flow path.

In another aspect of the present disclosure, the vent grooves are formed by removal of a portion of the metal material from a transmission housing, from a piston, from a stop member, or from a dam member.

In another aspect of the present disclosure, the vent grooves are in communication with an air flow passage venting out of the transmission via a transmission housing vent port.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
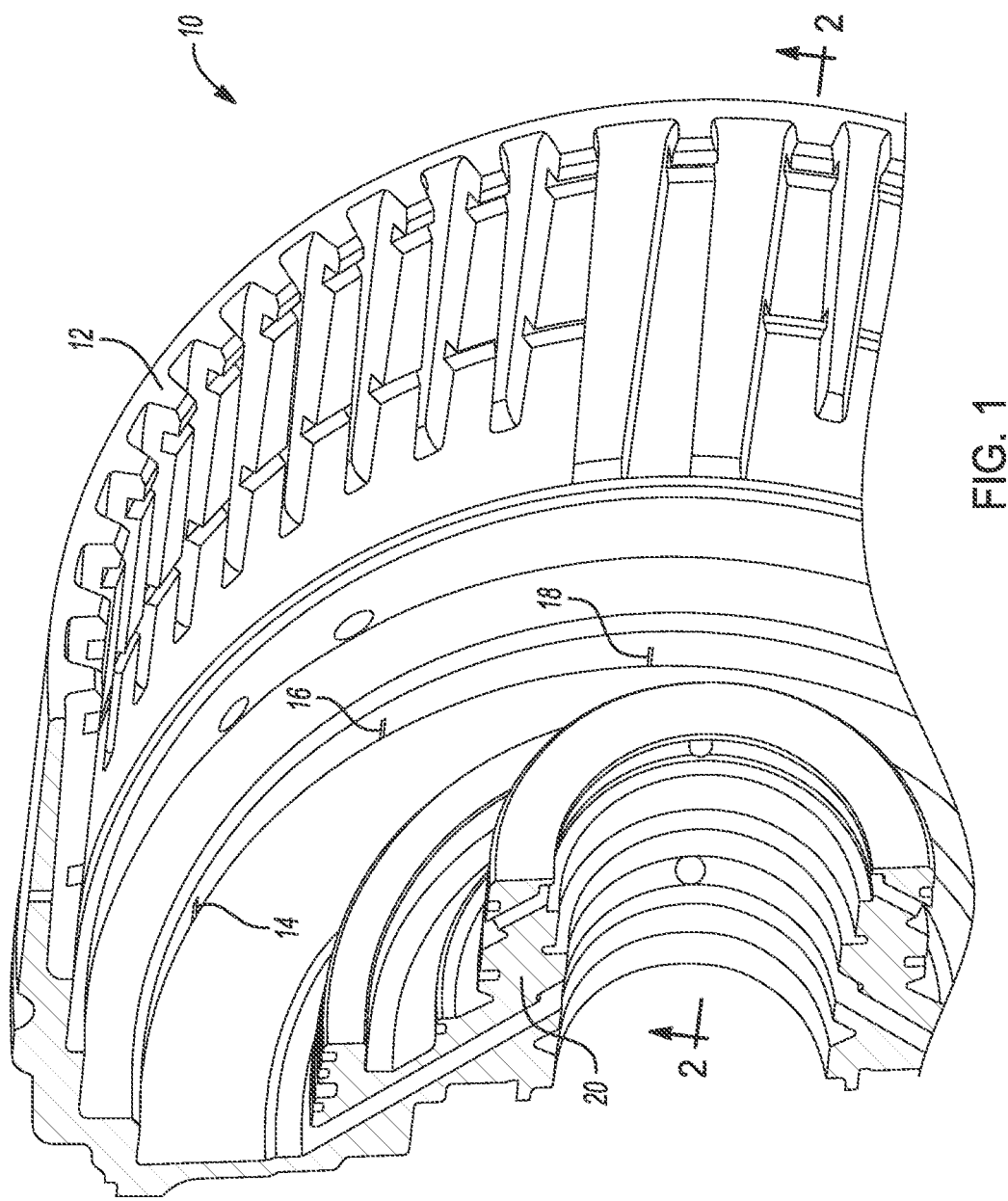
FIG. 1 is an end perspective view of a transmission having vent grooves according to an exemplary aspect.

Referring to FIG. 1, a transmission air vent system 10 is provided in an automatic transmission 12 of a vehicle. Air which collects in upper regions of the transmission 12 when the vehicle is not operating is automatically vented during vehicle and transmission startup using the transmission air vent system 10. To vent air, multiple vent grooves are created across from and facing transmission shift clutch pistons which include at least a first vent groove 14, a second vent groove 16 and a third vent groove 18. The vent grooves define micro grooves which can be formed for example using laser cutting, machining, etching, or similar methods and are spaced at equal intervals about a perimeter of a transmission housing, as well as within the transmission 12 as will be discussed in greater detail in reference to FIGS. 2 through 6 herein. Air within the transmission 12 is vented from internal cavities 20 of the transmission 12 out to atmosphere using air and oil flow paths which include the vent grooves. A quantity of the vent grooves in any single component is not limiting, and a minimum of three vent grooves is expected to provide adequate venting.

Figure 2:
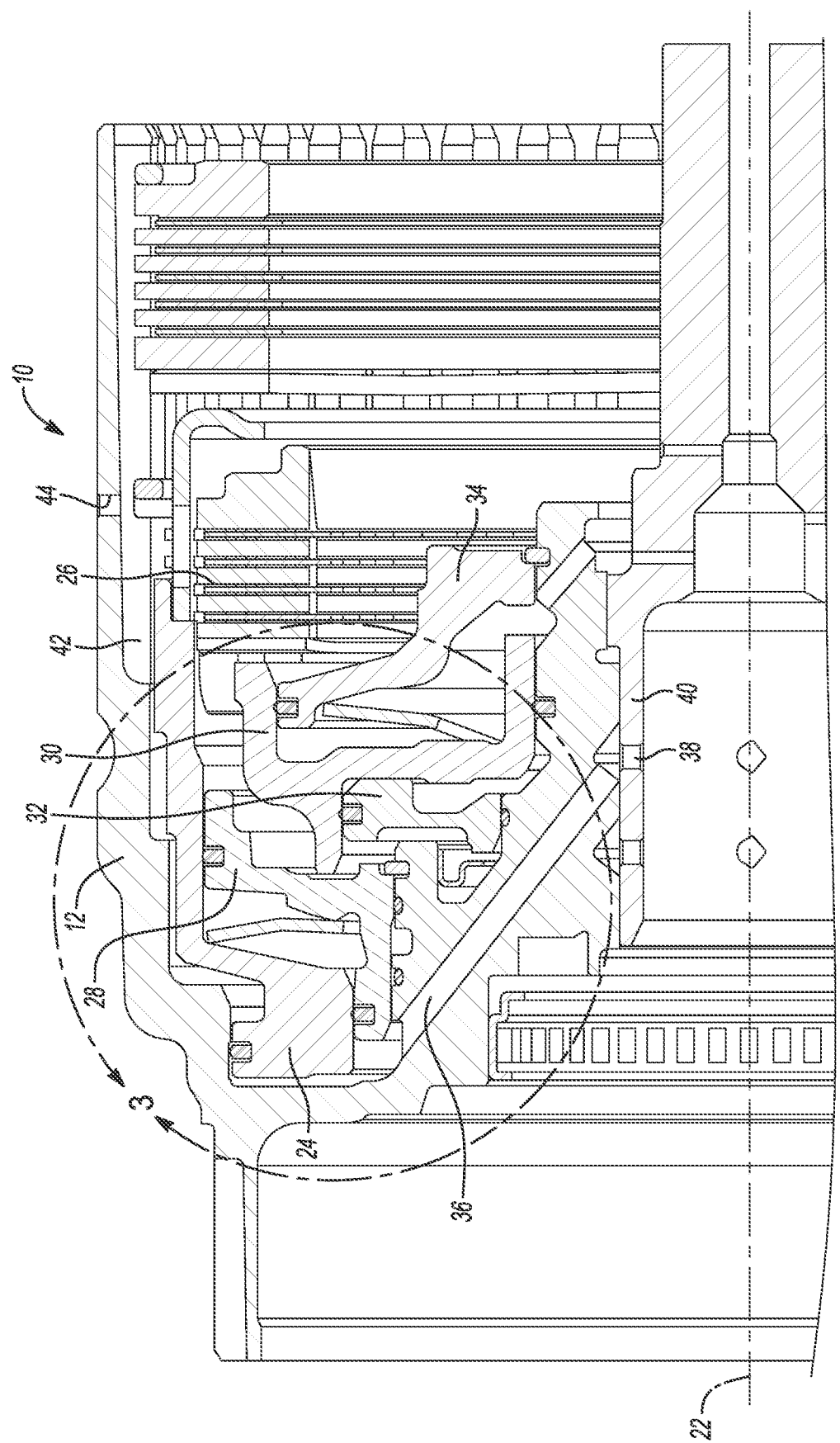
FIG. 2 is a cross sectional elevational view taken at section 2 of FIG. 1.

Referring to FIG. 2 and again to FIG. 1, interior components of the transmission 12 are configured symmetrically about a longitudinal central axis 22 of the transmission, therefore only an upper half cross section of the transmission is presented, with the following components configured symmetrically about the longitudinal central axis 22. A first clutch piston 24 of a metal material is slidably disposed with respect to an inner wall of the transmission 12 and when displaced actuates or de-actuates a clutch pack 26 having multiple clutch friction and reaction plates. A first dam 28 of a metal material is provided to guide and slidably support the first clutch piston 24. A second clutch piston 30 of a metal material is also slidably disposed within the transmission 12 and is also actuates or de-actuates the clutch pack 26. A stop 32 of a metal material is provided to act as a position stop for the second clutch piston 30. A second dam 34 of a metal material is provided to guide and slidably support the second clutch piston 30. With continuing reference to FIGS. 1 and 2, while the clutch pack 26 is commonly circumferentially configured about the transmission 12 and will be provided with multiple vent grooves equidistantly spaced about the perimeter of the body, pistons, stops or dams as discussed below, brake clutches which do not rotate may have only one or several vent grooves positioned at an elevated position, approximately at a 12 o'clock position as viewed in FIG. 1, to allow air venting.

Pressurized hydraulic fluid is provided to actuate the first clutch piston 24 via a fluid passage 36. The fluid passage 36 communicates with and receives the pressurized hydraulic fluid via a fluid port 38 provided in a transmission shaft 40. When the transmission 12 is idle, for example when the vehicle engine is not operating, air which is present throughout the internal cavities of the transmission 12 will rise within the transmission as the hydraulic fluid settles to a transmission sump (not shown). When the engine is started and a transmission gear shift is initiated, air which has accumulated for example in the fluid passage 36 will compress, interfering with flow of the substantially incompressible hydraulic fluid or oil to the first clutch piston 24, thereby limiting rapid actuation of the first clutch piston 24 when initiating a clutch shift. It is therefore desirable to provide vent paths for the air and a portion of the hydraulic oil to bleed past the various clutch pistons and into an air flow passage 42 for venting out of the transmission 12 via a transmission housing vent port 44.

Referring to FIG. 3 and again to FIGS. 1 and 2, the first clutch piston 24 is slidably disposed with respect to an inner wall 45 of a transmission housing 46. A fluid receiving cavity 48 upstream of the first clutch piston 24 provides exposure to a surface area of the first clutch piston 24 for the pressurized hydraulic fluid entering the fluid receiving cavity 48 from the fluid passage 36 to displace the first clutch piston 24 in a displacement direction 50 against an oppositely directed biasing force of a return spring 52. Hydraulic fluid is normally prevented from bypassing the first clutch piston 24 by a seal member 54 positioned in a seal member cavity 56 of the first clutch piston 24. The seal member 54 directly contacts and sealingly slides along the inner wall 45 during displacement of the first clutch piston 24 within a piston cavity 58 which opens into the air flow passage 42. To provide a passage for air and oil to bleed past the seal member 54 of the first clutch piston 24, a first vent groove 60 is created in the inner wall 45 which is described in greater detail in reference to FIGS. 4 and 5. According to further aspects, additional grooves can be provided across from and facing other seal members to promote venting of air within the transmission 12 which are not limited to clutch pistons. For example, a second vent groove 62 is created across from and facing a second seal member 64 of the first dam 28, and a third vent groove 66 is created across from and facing a third seal member 68 of the stop 32.

Figure 3:
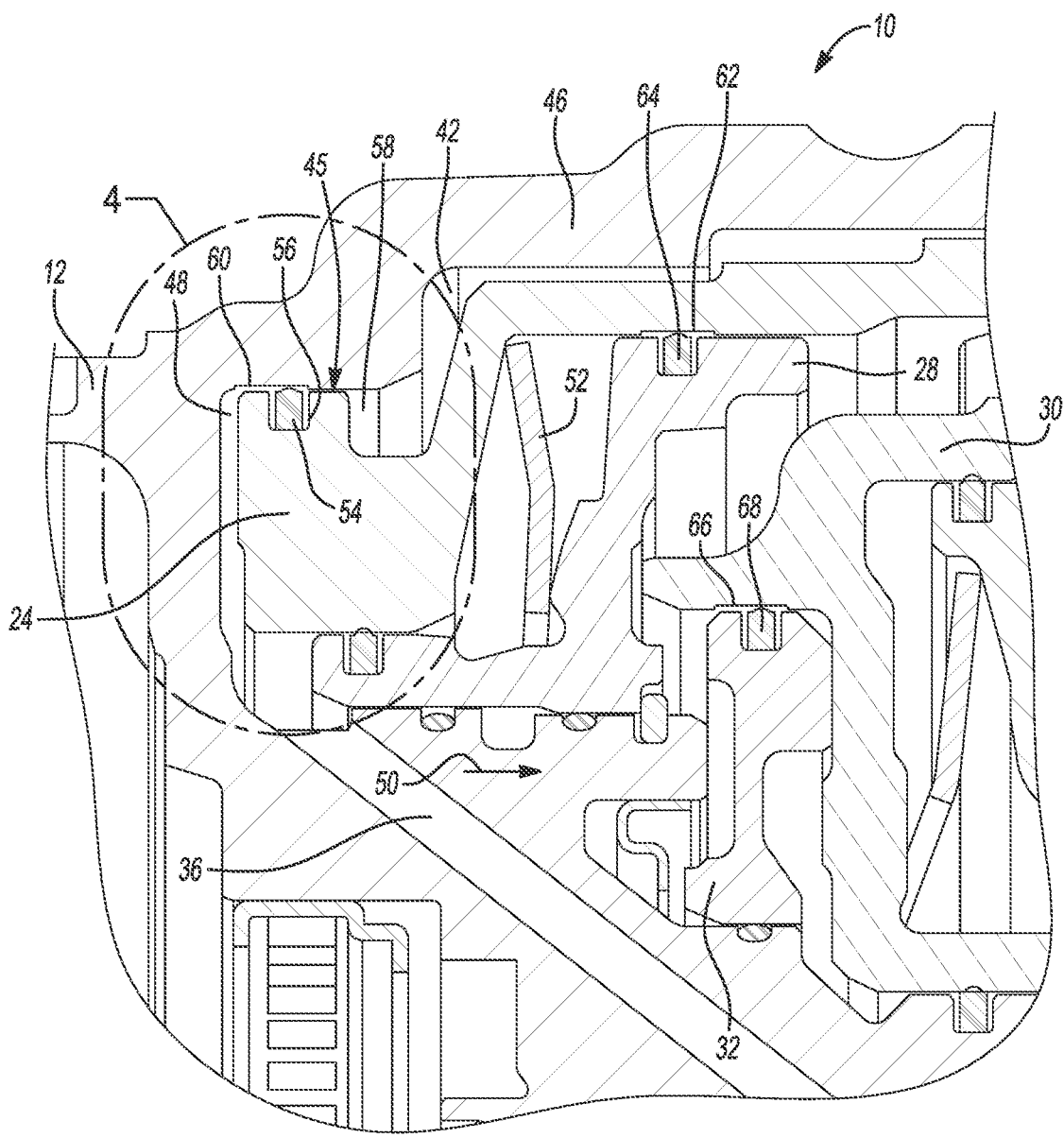
FIG. 3 is a cross sectional elevational view of area 3 of FIG. 2.
Figure 4:
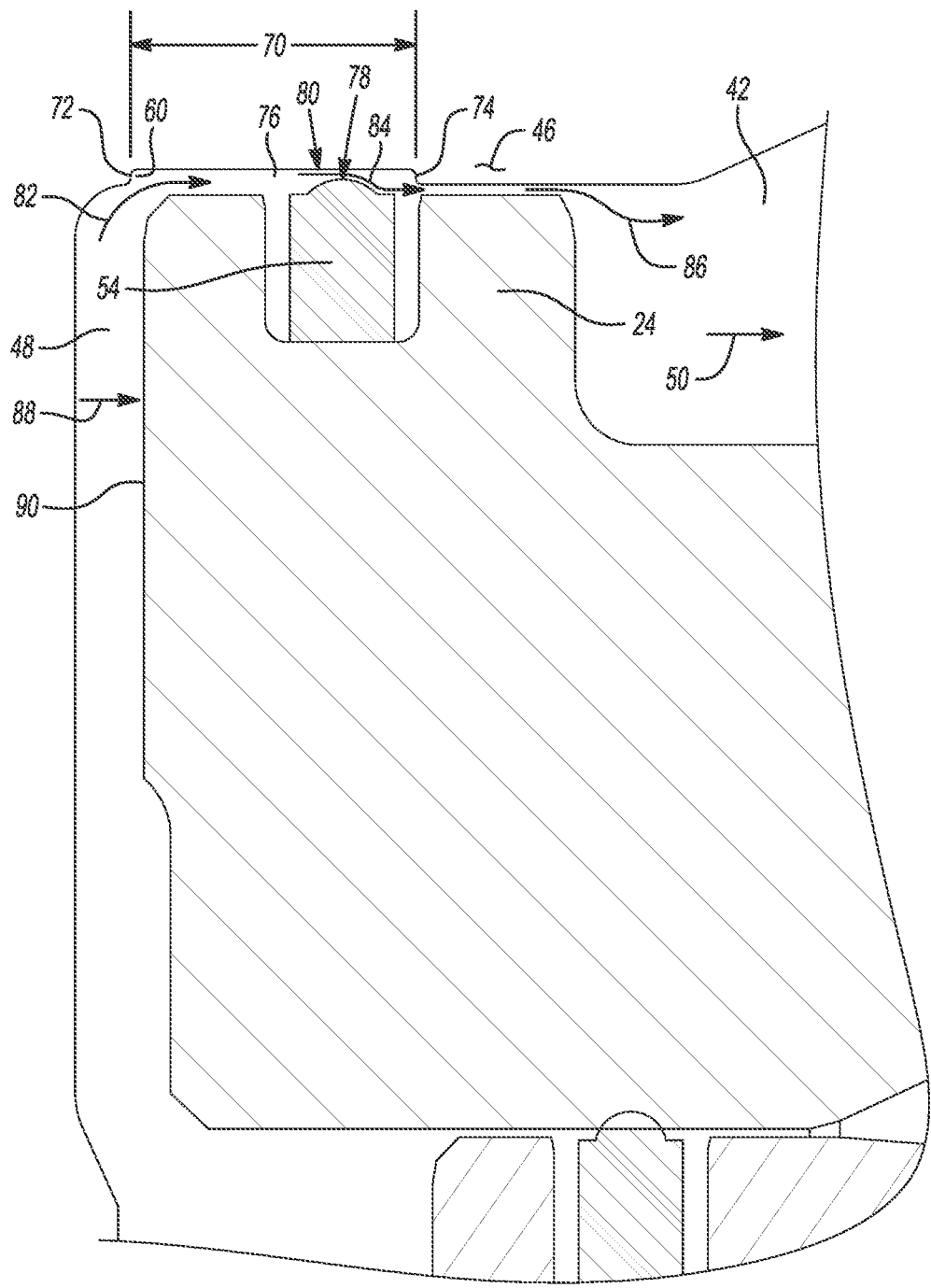
FIG. 4 is a cross sectional elevational view of area 4 of FIG. 3.
Figure 5:
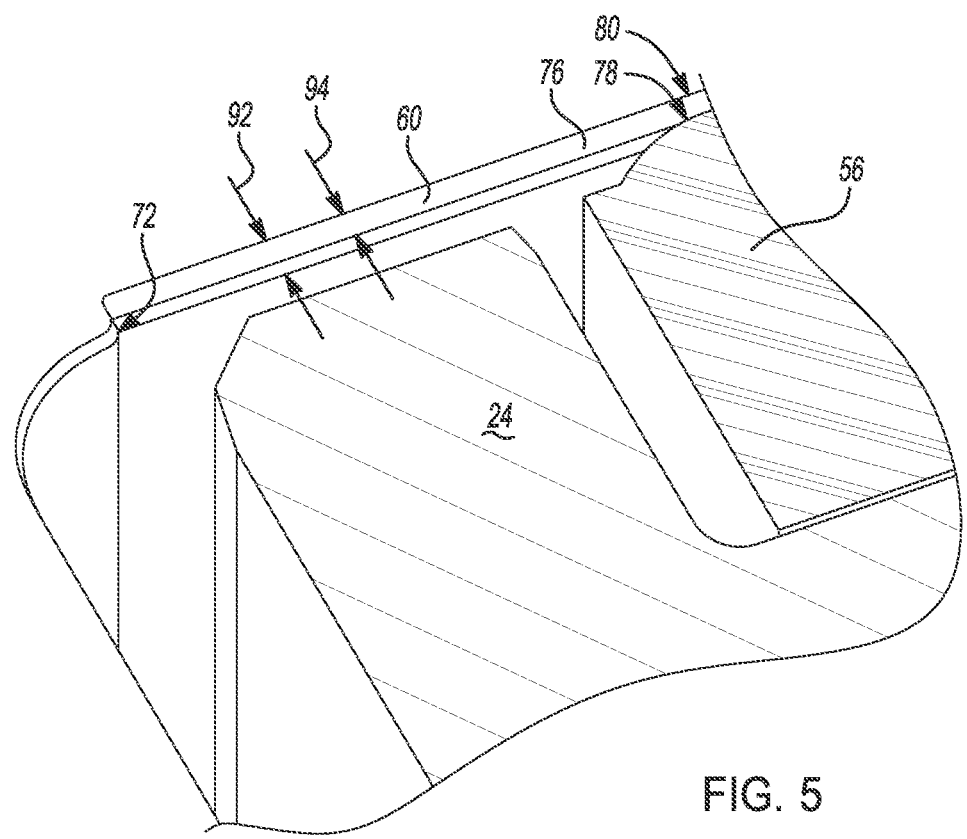
FIG. 5 is a bottom perspective view of the piston and vent groove of FIG. 4.
Figure 6:
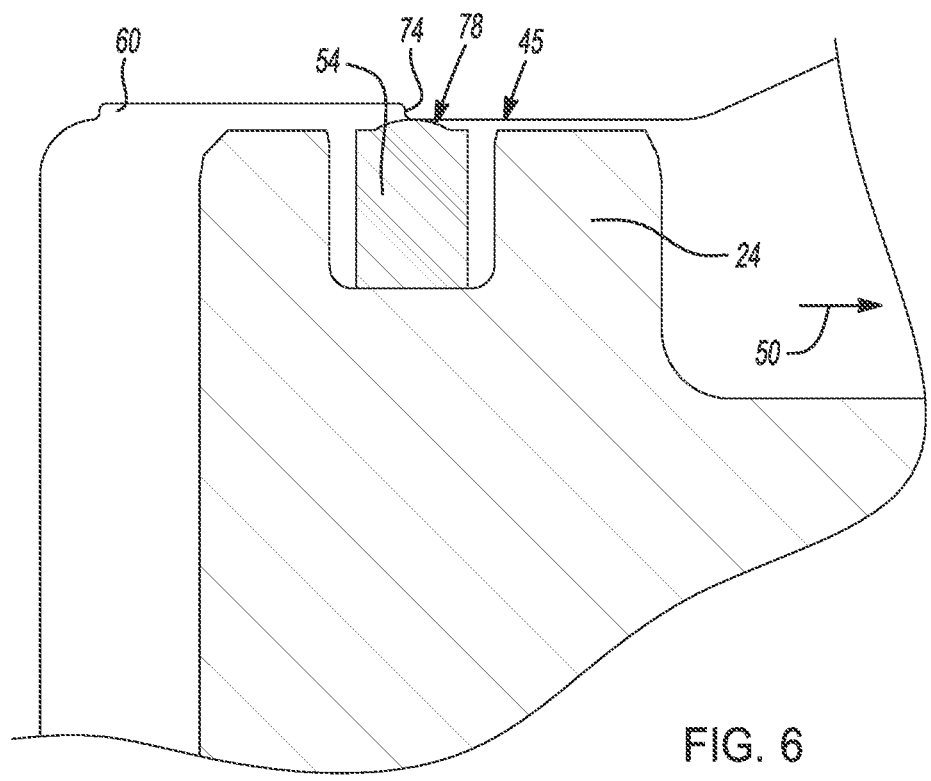
FIG. 6 is a cross sectional elevational view of area 4 of FIG. 3 modified to show the piston after travel to a piston stroked position.

Referring to FIG. 4 and again to FIGS. 2 and 3, a length 70 of the first vent groove 60 is predetermined based on a longitudinal displacement of the first clutch piston 24 in the displacement direction 50 between a first return position of the first clutch piston 24 shown in FIG. 4 and a second stroked position of the first clutch piston 24 shown in reference to FIG. 6. The vent grooves such as the first vent groove 60 include a curved or rounded first end 72 and a curved or rounded second end 74 to provide smooth surfaces in contact with the seal member 54 as the seal member 54 slides into or out of the first vent groove 60 along the inner wall 45 of the transmission housing 46. Other vent grooves are similarly configured and therefore are not further discussed herein.

In the first return position of the first clutch piston 24 a vent passage 76 is created between a free end 78 of the seal member 54 and an inner wall 80 of the first vent groove 60. As hydraulic fluid enters the fluid receiving cavity air within the fluid receiving cavity 48 is displaced in an air and oil flow path 82 upstream of the seal member 54 and transitions to an air and oil flow path 84 within the vent passage 76 and will exit in an air and oil flow path 86 into the air flow passage 42 for discharge out of the transmission 12. As air which may be combined with oil exit and hydraulic pressure builds within the fluid receiving cavity 48 pressure forces 88 acting against a face 90 of the first clutch piston 24 overcome the biasing force of the return spring 52 shown in FIG. 3, the first clutch piston 24 displaces in the displacement direction 50.

Referring to FIG. 5 and again to FIGS. 1 through 4, a total depth 92 of the first vent groove 60 is predetermined to allow for a minimum spacing or clearance gap 94 of the vent passage 76 to be maintained between the free end 78 of the seal member 54 and the inner wall 80 when the seal member 54 is positioned at least partially within the first vent groove 60. Normal wear of the free end 78 of the seal member 54 is therefore provided for while maintaining air venting capability.

Referring to FIG. 6 and again to FIGS. 1 through 4, the first clutch piston 24 is shown after displacement in the displacement direction 50 to a piston stroked position. At the piston stroked position, the free end 78 of the seal member 54 has exited from the first vent groove 60 and traversed the rounded second end 74 of the first vent groove 60 and compresses as it reaches frictional sealing contact with the inner wall 45 of the transmission housing 46. This sealing contact thereafter blocks air or oil passage between the free end 78 and the inner wall 45.

Figure 7:
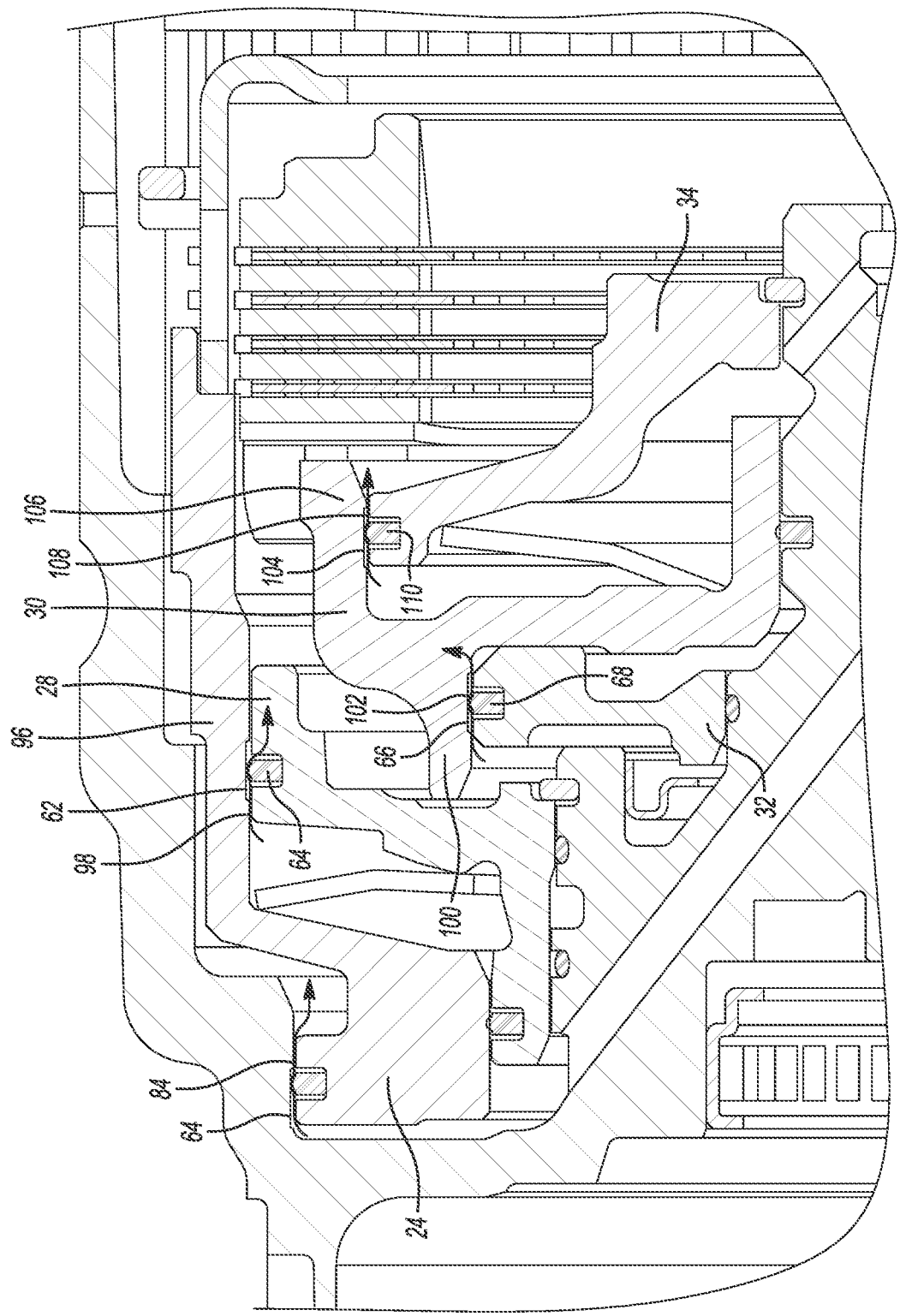
FIG. 7 is a cross sectional elevational view similar to area 3 of FIG. 2.

Referring to FIG. 7 and again to FIGS. 1 through 6, vent grooves of the present disclosure are not formed in a seal member to avoid tolerance issues of creating and maintaining cavities in resilient materials. Vent grooves of the present disclosure are therefore formed by removal of metal material from a transmission housing, from a piston, from a stop member, or from a dam member. The first vent groove 60 provides the air and oil flow path 84 around the second seal member 64. The second vent groove 62 is created in a longitudinal body portion 96 extending from the first clutch piston 24 and provides an air and oil flow path 98 around the second seal member 64. The third vent groove 66 is created in a body portion 100 of the second clutch piston 30 and provides an air and oil flow path 102 around the third seal member 68. A fourth vent groove 104 is created in a body portion 106 of the second clutch piston 30 and provides an air and oil flow path 108 around a fourth seal member 110 positioned in the second dam 34. These are exemplary positions of vent grooves of the present disclosure, as the disclosure is not limited to the exemplary positions above, and it is noted the air and oil flow paths identified herein also allow for passage of a small volume of oil to pass until the seal members exit from the vent grooves and seat to seal off the air and oil flow paths.

A transmission air vent system of the present disclosure offers several advantages. These include provision of vent grooves in metal components in multiple transmission locations and in multiple different components including a transmission housing, a piston, a stop member, or a dam member. The vent grooves of the present disclosure provide more controlled paths for bleeding air from a transmission than provided from air paths extending directly through resilient material seal members. The vent grooves of the present disclosure can be applied in rotational clutches and in stationary clutches.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle transmission air vent system, comprising:
  a first component of a vehicle transmission having a resilient material seal member positioned in a seal member cavity created in the first component;
  a second component of a metal material having a vent groove formed in the second component;

one of the first component or the second component displaces with respect to the other one of the first component or the second component; and the vent groove receiving a portion of the seal member in a first displaced position of the displaced one of the first component or the second component defining an air and oil flow path through the vent groove between the first component and the second component, the seal member being positioned outside of the vent groove in a second displaced position of the displaced one of the first component or the second component, wherein the vent groove includes a rounded first end and a rounded second end.

2. The automobile vehicle transmission air vent system of claim 1, wherein:

the first component defines a clutch piston; and the second component defines a transmission housing.

3. The automobile vehicle transmission air vent system of claim 2, wherein when the seal member is positioned outside of the vent groove in the second displaced position the seal member sealingly engages with the transmission housing.

4. The automobile vehicle transmission air vent system of claim 1, wherein:

the first component defines a dam; and the second component defines a longitudinal body portion of a clutch piston.

5. The automobile vehicle transmission air vent system of claim 4, wherein when the seal member is positioned outside of the vent groove in the second displaced position the seal member sealingly engages with the longitudinal body portion of the clutch piston.

6. The automobile vehicle transmission air vent system of claim 1, wherein:

the first component defines a stop; and the second component defines clutch piston.

7. The automobile vehicle transmission air vent system of claim 6, wherein when the seal member is positioned outside of the vent groove in the second displaced position the seal member sealingly engages with the clutch piston.

8. The automobile vehicle transmission air vent system of claim 1, wherein a clearance gap is created between the portion of the seal member and a wall of the vent groove when the vent groove is in the first displaced position, the clearance gap defining the air and oil flow path for air to bleed past the seal member.

9. The automobile vehicle transmission air vent system of claim 1, wherein a length of the vent groove is predefined as a distance between a return position and a stroked position of the displaced one of the first component or the second component.

10. An automobile vehicle transmission air vent system, comprising:

a first component of a vehicle transmission having a resilient material seal member retained in a seal member cavity created in the first component;

a second component of a metal material having a vent groove formed in the second component facing toward the seal member;

a clutch pack of the vehicle transmission actuated by one of the first component or the second component being displaced into engagement with the clutch pack; and the vent groove receiving a portion of the seal member in a first displaced position of the displaced one of the first component or the second component defining an air and oil flow path through the vent groove between the first component and the second component, the seal member being positioned outside of the vent groove in a second displaced position of the displaced one of the first component or the second component, wherein the first component defines a dam and the second component defines a longitudinal body portion of a clutch piston, and when the seal member is positioned outside of the vent groove in the second displaced position the seal member elastically deflects to sealingly engage with the longitudinal body portion of the clutch piston.

11. The automobile vehicle transmission air vent system of claim 10, wherein the vent groove includes a rounded first end and a rounded second end allowing unimpeded entrance of the seal member into the vent groove and exit of the seal member out of the vent groove between the first displaced position and the second displaced position.

12. The automobile vehicle transmission air vent system of claim 11, wherein a length of the vent groove is predefined as a distance between a return position and a stroked position of the displaced one of the first component or the second component.

13. The automobile vehicle transmission air vent system of claim 12, wherein a depth of the vent groove is predetermined to create a minimum clearance gap at the air and oil flow path between an end of the seal member and an inner wall of the vent groove when the seal member is positioned at least partially within the vent groove.

14. An automobile vehicle transmission air vent system, comprising:

a first component of a vehicle transmission having a resilient material seal member retained in a seal member cavity created in the first component;

a second component of a metal material having multiple vent grooves formed at predetermined intervals on a perimeter of the second component, the multiple vent grooves facing toward the seal member;

a clutch pack of the vehicle transmission actuated by one of the first component or the second component being displaced into engagement with the clutch pack;

a flow passage communicating a pressurized fluid to one of the first component or the second component to displace the one of the first component or the second component; and the vent grooves individually receive a portion of the seal member in a first displaced position of the displaced one of the first component or the second component defining an air and oil flow path through individual vent grooves between the displaced one of the first component or the second component allowing air and oil flow from the flow passage through the air and oil flow path, the seal member being positioned outside of the vent groove in a second displaced position of the displaced one of the first component or the second component blocking flow through the air and oil flow path.

15. The automobile vehicle transmission air vent system of claim 14, wherein the vent grooves are formed by partial removal of the metal material from a transmission housing, from a piston, from a stop member, or from a dam member.

16. The automobile vehicle transmission air vent system of claim 14, wherein the vent grooves are in communication with an air flow passage venting out of the transmission via a transmission housing vent port.

* * * * *